April 10, 1962   E. E. CHAPIN ET AL   3,028,888
MITRE BOX WITH MAGNETIC SAW RETAINING MEANS
Filed June 19, 1959   2 Sheets-Sheet 2

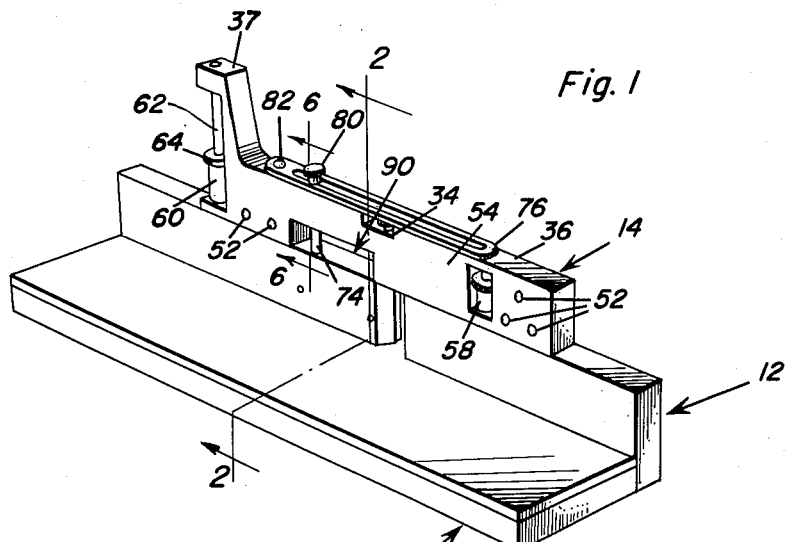
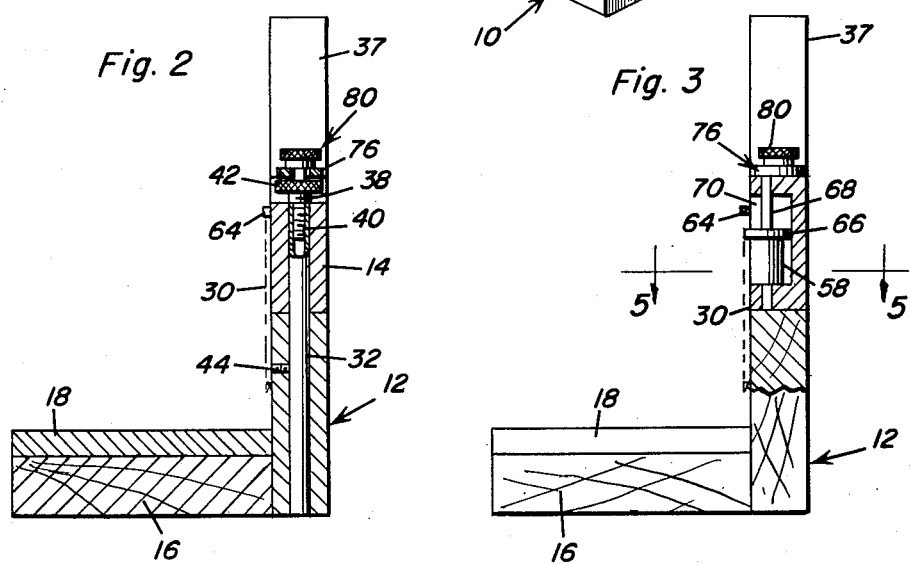
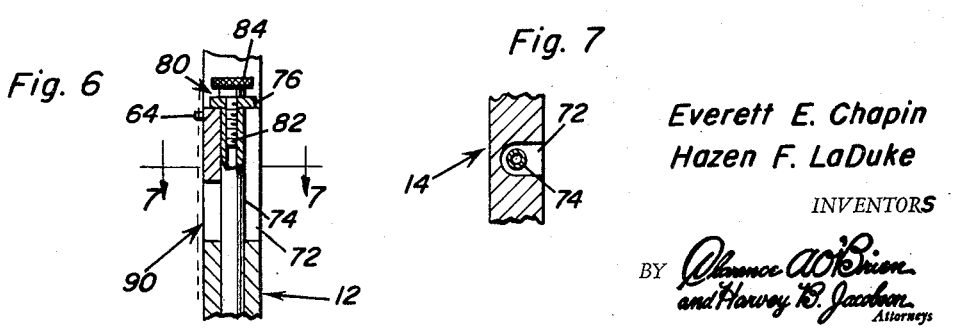

Everett E. Chapin
Hazen F. LaDuke
INVENTORS

BY Clarence A. O'Brien
and Harvey B. Jacobson
Attorneys

United States Patent Office

3,028,888
Patented Apr. 10, 1962

3,028,888
MITRE BOX WITH MAGNETIC SAW
RETAINING MEANS
Everett E. Chapin, P.O. Box 488, and Hazen F. La Duke,
P.O. Box 478, both of Carson City, Nev.
Filed June 19, 1959, Ser. No. 821,557
9 Claims. (Cl. 143—89)

This invention relates generally to an improved box and more particularly to a mitre box construction incorporating magnetic means for securing a saw blade adjacent a saw guide for effecting the desired angular cut on a piece of work supported on a base.

Of course, it is well known that mitre boxes have long been in use for providing guide means for hand saws to aid in properly angularly sawing a piece of work. Various mitre box constructions are revealed by the prior art and each appears to be effective for accomplishing the contemplated objects. However, they all appear to be deficient inasmuch as they lack means for retaining the saw blade in the precise desired position and accordingly care must be taken by the operator to assure that a proper cut is effected. In order to facilitate the sawing of a piece of work, the applicant herein has developed holding means in the form of permanent magnets for retaining a saw blade flush against a pivotally mounted saw guide for assuring a proper cut.

Accordingly, it is the principal object of this invention to provide a novel mitre box construction incorporating novel magnetic means for facilitating the retention of a saw blade adjacent a saw guide.

It is a further object of this invention to provide a novel mitre box construction which is relatively simple and accordingly inexpensive to manufacture. It also appears that since permanent magnets are utilized, the device would be cost-free in operation and durable and reliable.

In accordance with the above stated objects, below is particularly described the novel construction and utilization of the mitre box forming the subject matter of this invention. Initially, a base is provided which has an upstanding backing member fixed thereon. A pivotal axis extends through the backing member and receives thereon a saw guide adapted to be pivoted relative to the base and backing member. The saw guide is provided with a plurality of permanent magnets which have pole faces flush with a saw guide surface for engaging a saw blade to retain the blade against the saw guide surface. Further, cylindrical roller permanent magnets are carried on vertical shafts in exposed manner in openings formed in the saw guide. The roller permanent magnets are so disposed that a tangent to an arcuate surface thereof coincides with the saw guide surface mentioned. Accordingly, it will be apparent that a saw blade will be retained by the magnet flush against the saw guide surface. The backing member defines a passage therein for receiving the saw blade therethrough at a plurality of different angles for allowing the saw blade to effect a proper cut in a piece of work on the base. Means are provided for locking the saw guide relative to the base in the form of a slotted member terminally pivotally connected to the saw guide. The slotted member rides on top of a collar extending upwardly from the backing member and the threaded shank portion of a bolt is threadedly engaged within the collar and extends through the slot in the slotted member. A knurled head on the bolt is adapted to bear against the slotted member for locking the slotted member and of course the saw guide relative to the base and backing member. The slotted member may be graduated if desired.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the mitre box construction;

FIGURE 2 is a sectional view taken substantially along the plane 2—2 of FIGURE 1;

FIGURE 3 is an end view of the mitre box partially broken away illustrating in detail one of the permanent magnet rollers;

FIGURE 6 is a sectional view taken substantially along the plane 6—6 of FIGURE 1;

FIGURE 7 is a sectional view taken substantially along the plane 7—7 of FIGURE 6.

Figure 4:
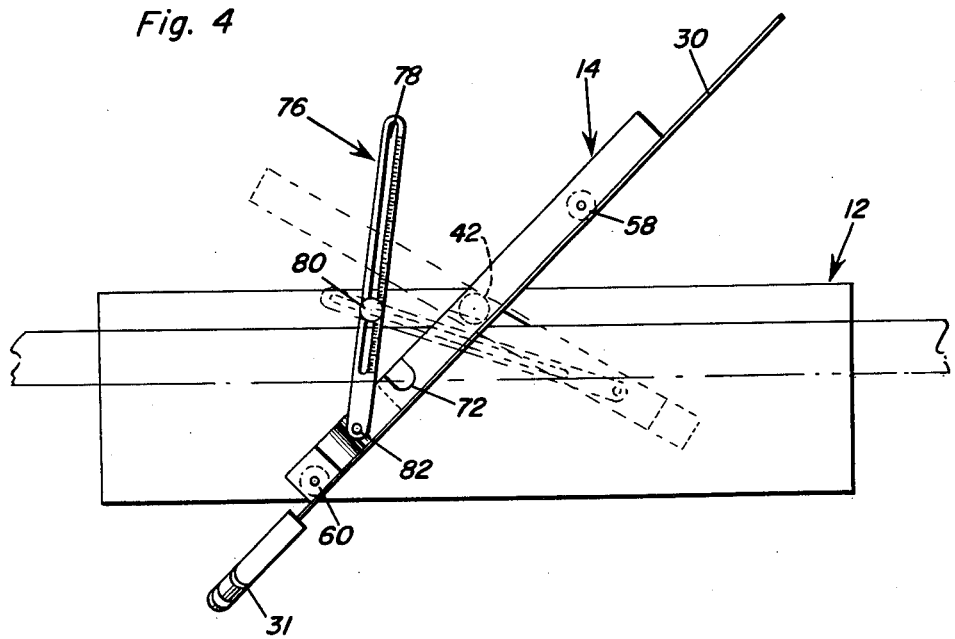
FIGURE 4 is an elevational plan view illustrating the saw guide in a pivoted position with a saw blade secured flush thereagainst.

With continuing reference to the drawings, initial reference is made to FIGURE 1 wherein a base 10 is illustrated having an upstanding backing member 12 in engagement therewith with the backing member 12 interposed between the base 10 and a saw guide 14.

The base 10 is preferably substantially rectangular in shape and includes a bottom portion 16 of wood or such which has a top portion 18 of fiberboard superposed thereon.

The backing member 12 includes a passageway 20 defined therein. The passageway 20 is defined by converging sides 22 and 24 which form a first throat and 26 and 28 which form a second throat. With the sides angled as illustrated in FIGURE 8, it will be apparent that a saw blade 30 may extend through the passage 20 in any of a plurality of positions; that is, blade 30 may be pivoted about the passageway 20 for purposes to be well understood below.

Figure 8:
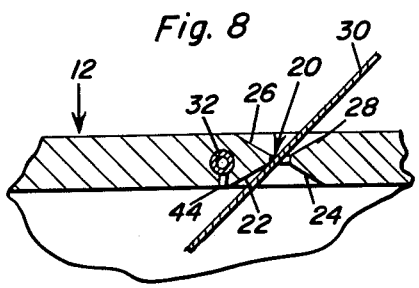
FIGURE 8 is a sectional view illustrating in detail the passage formed in the backing member.

A collar or tubular shaft 32 extends through the backing member 12 and through the saw guide 14 as is illustrated in FIGURES 2 and 8. An indented portion 34 is in the top surface 36 of the saw guide 14. The collar or tubular shaft 32 is internally threaded and receives a bolt 38 having a threaded shank portion 40 therein. The bolt 38 has a knurled head 42 which extends into the indented portion 34. The saw guide 14 is pivotable about the collar 32 as illustrated in FIGURE 4. A setscrew 44 extends through the upstanding backing member 12 to secure the collar 32.

Figure 5:
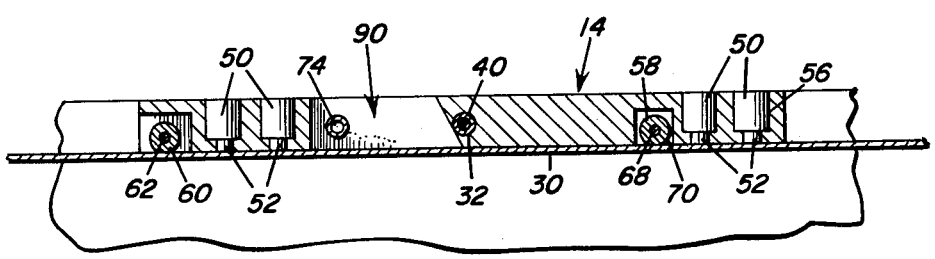
FIGURE 5 is a sectional view taken substantially along the plane 5—5 of FIGURE 3.

The saw guide 14 includes a plurality of permanent magnets therein for slidably retaining the saw blade 30 adjacent thereto. Initially, permanent magnets 50 having pole faces 52 are received in the saw guide as particularly illustrated in FIGURE 5. The pole faces 52 are so arranged that they are disposed flush with the front surface 54 of saw guide 14. The permanent magnets 50 are preferably received in counterbored apertures at 56 defined in the saw guide 14 for assuring the proper accommodation of the permanent magnets. As clearly illustrated in FIGURE 5, the pole faces 52 of the magnets 50 engage the saw blade 30 for retaining the saw blade adjacent the saw guide 14. In addition to the magnets 50, a pair of cylindrical roller magnets 58 and 60 are carried by the saw guide 14 for properly retaining the saw blade 30. The top surface 36 of the saw guide 14 terminates in an upwardly extending portion 37. Defined between the portion 37 and the bottom of the saw guide 14 is a U-shaped carrier. Therein, a vertical shaft 62 is secured and the cylindrical roller magnet 50 is slidably carried thereby.

The roller magnet 60 includes a top flange portion 64 adapted to ride along the upper saw blade edge. The roller magnet 60 apparently is rotatable on the shaft 62 so that the saw blade 30 may be retained thereagainst while it may be reciprocated relative to the saw guide 14. The roller magnet 58 has a flange 66 thereon and the roller magnet 58 is slidably received on a vertical shaft 63 secured in an opening 70 defined in the front surface 54 of the saw guide 14. The flange 66 is likewise adapted to ride along the top surface of the saw blade 30.

In order to determine the angular relationship between the saw guide 14 and the backing member 12, a cut-out 72 is defined in the saw guide 14 (see FIGURE 4) for receiving therein a collar 74 extending upwardly through the upstanding backing member 12. A slotted member 76 has a slot 78 running therethrough and graduations 80 imprinted on one side thereof. The slotted member 76 is terminally and pivotally fastened by rivet 82 to the saw guide 14. The slotted member 76 rides along the top surface of the collar 74 as is clearly illustrated in FIGURE 6. A bolt 80 having a threaded shank portion 82 is threadedly received within the collar 74. The bolt 80 has a knurled head 84 which is adapted to bear against the slotted member 76 to lock the slotted member 76 relative to the collar 74 which of course is fixed within the backing member 12. It will also be apparent that besides the locking effect offered by the bolt 80, the bolt 38, when screwed tightly, aids in locking the saw guide 14 relative to the upstanding member 12 to prevent further pivotal movement. The collar 74 extends through an opening 90 (FIGURES 1 and 5) defined in the saw guide 14.

It is thought that the construction and utilization of the invention should now be apparent. Initially, when it is desired to cut a piece of wood at a desired angle, the wood is placed on the fiberboard surface 18. The saw guide 14 is then pivoted about the pivot axis or collar 32 to position, as for instance illustrated in FIGURE 4. The particular position may be arrived at by determining the angle desired and referring to the graduations 80 of the slotted member 76. When the saw guide 14 is in the proper position, the knurled head of the bolts 80 and 38 may be screwed tightly to secure the saw guide 14 in the desired position. The saw having the handle 31 and saw blade 30 may then be placed flush against the front surface 54 of said guide 14. The magnets 50 along with the roller magnets 58 and 60 assure that the saw blade will be retained flush against the surface 54 with little attention directed thereto by the operator. The roller magnets 58 and 60 are vertically adjustable, as noted, for riding along the top surface of the saw blade 30. The piece of work may then be cut by moving the saw blade 30 back and forth along the surface 54 and the saw blade may pass through the passage 20 defined in the backing member 12 to cut the piece of work. As is noted above, the passage 20 is so defined as to accommodate the saw blade 30 in any of a plurality of positions.

The mitre box may find further utilization in the cutting of molding by passing the molding through the opening 90 defined in the saw guide 14.

From the foregoing, it should be apparent that an improved mitre box incorporating permanent magnets has been provided for producing a more accurate cut than is produced by heretofore known mitre boxes. Further, it should be apparent that the constructional features of the device provide three points, namely, the pivot point 82, the bolt 80 and the bolt 38, for absorbing the thrust of the saw on the saw guide 14. The mitre box herein disclosed is adapted to be utilized with any standard finishing saw. The box apparently eliminates the wobble in the cutting edge of the saw, thus assuring repeated accurate cuts. It is contemplated that the box may be made small enough so that it can be carried in a carpenter's tool box if desired. Without departing from the teachings of the invention, metal cutting saws may be utilized for cutting light metals. The particular materials contemplated in the construction of the box have not been disclosed, and it is thought that a plurality of materials well adapted for the purpose will immediately come to the mind of one skilled in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An improved mitre box construction including a base, a saw guide above said base pivotally supported about a first pivotal axis, said first pivotal axis extending perpendicularly from said base and magnetic holding means carried by said saw guide for retaining a saw blade flush against a surface of said saw guide, said magnetic holding means including a plurality of cylindrical permanent magnets having top edge guide flanges, vertical shafts exposed in open portions of said saw guide, said cylindrical magnets rotatably and slidably received on said shafts, said cylindrical magnets so disposed that a tangent to the arcuate surface thereof coincides with said saw guide surface.

2. An improved mitre box construction including a base, a saw guide above said base pivotally supported about a first pivotal axis, said first pivotal axis extending perpendicularly from said base and magnetic holding means carried by said saw guide for retaining a saw blade flush against a surface of said saw guide, said magnetic holding means including a plurality of permanent magnets disposed in said guide with pole faces of said magnets aligned with said saw guide surface, a plurality of cylindrical permanent magnets having top edge guide flanges, vertical shafts exposed in open portions of said saw guide, said cylindrical magnets rotatably and slidably received on said shafts, said cylindrical magnets so disposed that a tangent to the arcuate surface thereof coincides with said saw guide surface.

3. An improved mitre box construction including a base, a saw guide above said base pivotally supported about a first pivotal axis, said first pivotal axis extending perpendicularly from said base and magnetic holding means carried by said saw guide for retaining a saw blade flush against a surface of said saw guide, said magnetic holding means including a plurality of permanent magnets disposed in said guides with pole faces of said magnets aligned with said saw guide surface, a plurality of cylindrical permanent magnets having top blade edge guiding flanges, vertical shafts exposed in open portions of said saw guide, said cylindrical magnets rotatably and slidably received on said shafts, said cylindrical magnets so disposed that a tangent to the arcuate surface thereof coincides with said saw guide surface, an upstanding backing member fixed to said base intermediate said base and said saw guide, a passage defined in said upstanding backing member, said passage adapted to receive a saw blade therethrough for engaging, at a desired angle, a piece of work supported on said base.

4. An improved mitre box construction including a base, a saw guide above said base pivotally supported about a first pivotal axis, said first pivotal axis extending perpendicularly from said base and magnet holding means carried by said saw guide for retaining a saw blade flush against a surface of said saw guide, said magnetic holding means including a plurality of permanent magnets disposed in said guides with pole faces of said magnets aligned with said saw guide surface, a plurality of cylindrical permanent magnets having top blade edge guiding flanges, vertical shafts exposed in open portions of said saw guide, said cylindrical magnets rotatably and slidably received on said shafts, said cylindrical magnets so disposed that a tangent to the arcuate surface thereof coincides with said saw guide surface, an upstanding backing member fixed to said base intermediate said base and said saw guide, a passage defined in said upstanding backing member, said passage adapted to receive a saw blade therethrough for engaging, at a desired angle, a piece of work supported on said base, and locking means for locking said saw guide in a desired pivotal position relative to said base, said locking means including a slotted member terminally pivoted to said saw guide, said slotted member defining a slot therein, an internally threaded collar disposed within said saw guide, a bolt having a knurled head portion and a shank portion, said shank portion received in said collar, said slotted member engaged with said collar with said bolt shank portion extending through said slot whereby said slotted member be prevented from moving due to the bearing engagement of said knurled head portion against said slotted member.

5. An improved mitre box construction including a base, a saw guide above said base pivotally supported about a first pivotal axis, said first pivotal axis extending perpendicularly from said base and magnetic holding means carried by said saw guide for retaining a saw blade flush against a surface of said saw guide, said magnetic holding means including a plurality of permanent magnets disposed in said guides with pole faces of said magnets aligned with said saw guide surface, a plurality of cylindrical permanent magnets having top blade edge guiding flanges, vertical shafts exposed in open portions of said saw guide, said cylindrical magnets rotatably and slidably received on said shafts, said cylindrical magnets so disposed that a tangent to the arcuate surface thereof coincides with said saw guide surface, and locking means for locking said saw guide in a desired pivotal position relative to said base, said locking means including a slotted member terminally pivoted to said saw guide, said slotted member defining a slot therein, an internally threaded collar disposed within said saw guide, a bolt having a knurled head portion and a shank portion, said shank portion received in said collar, said slotted member engaged with said collar with said bolt shank portion extending through said slot whereby said slotted member be prevented from moving due to the bearing engagement of said knurled head portion against said slotted member.

6. An improved mitre box construction including a base, a saw guide pivotally mounted above said base about a pivotal axis extending perpendicular thereto and presenting a guide surface along which movement of a saw blade is accommodated and magnetic holding means mounted on the saw guide for movement relative thereto including a portion generally movable in the direction of movement of the saw blade when in contact therewith to retain the saw blade flush against the guide surface to reduce the friction drag thereon.

7. The combination of claim 6, wherein said magnetic holding means is movably mounted about an axis spaced from the guide surface for movement of said portion in the general direction of movement of said saw blade when in contact therewith.

8. The combination of claim 7 wherein said magnetic holding means is further movable in a vertical direction within limits and includes blade edge confining means projecting from said guide surface for guiding a top edge of the saw blade.

9. The combination of claim 6 wherein said magnetic holding means is further movable in a vertical direction within limits and includes blade edge confining means projecting from said guide surface for guiding a top edge of the saw blade.

References Cited in the file of this patent

UNITED STATES PATENTS

| | | |
|---|---|---|
| 665,693 | Page | June 8, 1901 |
| 914,543 | Whitmore | Mar. 9, 1909 |
| 1,111,904 | Kahrs | Sept. 29, 1914 |
| 2,281,469 | Weddle et al. | Apr. 28, 1942 |
| 2,323,319 | Finnell | July 6, 1943 |
| 2,596,322 | Zumwalt | May 13, 1952 |
| 2,838,009 | Bonamno | June 10, 1958 |